Inventors
J. Walsh
H. Dawson

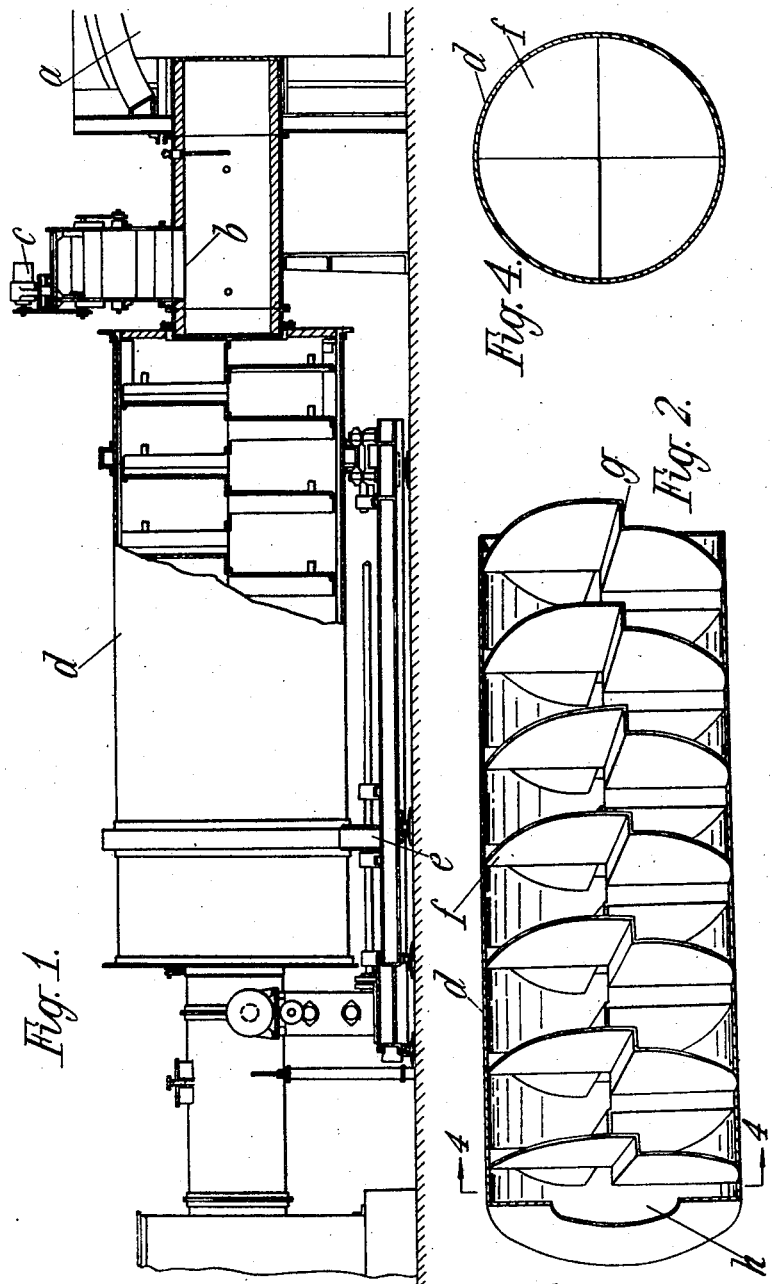

Patented Dec. 1, 1953

2,660,807

UNITED STATES PATENT OFFICE 2,660,807

DRYING MACHINE FOR GRASS AND OTHER CROPS

John Walsh and Harry Dawson, Rochdale, England, assignors to Petrie & McNaught Limited, Rochdale, Lancashire, England, a British company Application December 1, 1950, Serial No. 198,546

4 Claims. (Cl. 34—136)

This invention relates to drying machines of the revolving drum or cylinder type in which the grass or the like (hereinafter for convenience termed grass) is fed into the drum, which has its axis horizontal or substantially so, at one end along with a current of hot air, there being baffles in the drum to cause the air and grass to take a circuitous course through the drier.

The object of the present invention is to provide an improved arrangement of drying drum or cylinder which ensures that the grass is satisfactorily dried in a minimum of time whilst passing through the drum.

In accordance with our present invention, the drum or cylinder is provided with a continuous internal baffle in the form of a helix which revolves with the drum and ensures that the grass and hot gases flow in a helical path through the drum. The latter also has on its internal surface inwardly projecting plates extending parallel with the axis of the drum in order to exert a lifting and tumbling action on the grass as the drum revolves. The spiral path is completely flooded with the hot gases which cannot, as with present radial baffle or division arrangements, bypass any part of the drum by taking a short path from baffle to baffle.

The spiral or helical baffle may have a gradually increasing pitch from the inlet to the delivery end of the drum so that the velocity of the gases is reduced as drying proceeds and greater efficiency is ensured.

The spiral or helical baffle may be of a continuously curved form or may consist of straight pieces joined to form the spiral or helix and to cause the grass to make successive impacts on the helix as it travels forward through the machine under the pull of the relatively high velocity gas current. Or as an alternative the progressive advance of the helix may be made by stepping the material of which the helix is made, in a radial direction. The axial width or length of the steps may gradually increase from the inlet to the delivery end of the helix in order to reduce gradually the gas velocity through the machine. The steps or radial faces will act as paddles to lift the grass and cause maximum disturbance thereof which assists materially in the drying operation.

The drum may be a cylinder of uniform diameter throughout or it may be a cone with its larger diameter at the delivery end.

The rate of rotation of the drum as also the rate of feed of the grass into the drum can be varied to suit the working conditions. If desired the drum may be driven intermittently and automatically in reverse directions to control the rate of flow through the drum.

Referring to the accompanying explanatory drawings:

Figure 1 shows the general arrangement of a grass drying machine in accordance with the invention.

Figure 2 is a perspective view of one form of the drum.

Figure 4 is a cross section on the line 4—4 of Figure 2.

The machine is supplied with hot gases from a furnace $a$ and grass is fed in at $b$ by a conveyor driven by a motor $c$. The material is carried by the hot gases through the drum $d$, which revolves on rollers $e$.

Figure 3:
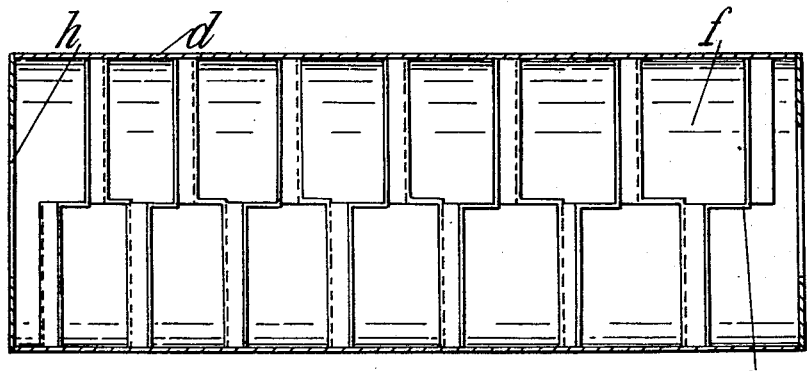
Figure 3 is a longitudinal section.

As shown in Figures 2–4, the drum $d$ contains a helical baffle $f$ formed of sheet metal which is stepped along radial lines 90° apart as at $g$. The axial length of the steps increases gradually from the inlet end $h$ to the outlet end.

Figure 5:
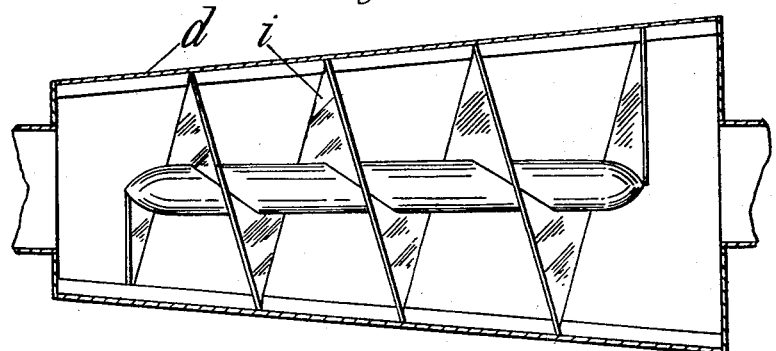
Figure 5 is a longitudinal section of another form of drum.

In Figure 5, the baffle $i$ is of continuously curved form and the drum is of frusto-conical form with the larger diameter at the outlet end.

Figure 6:
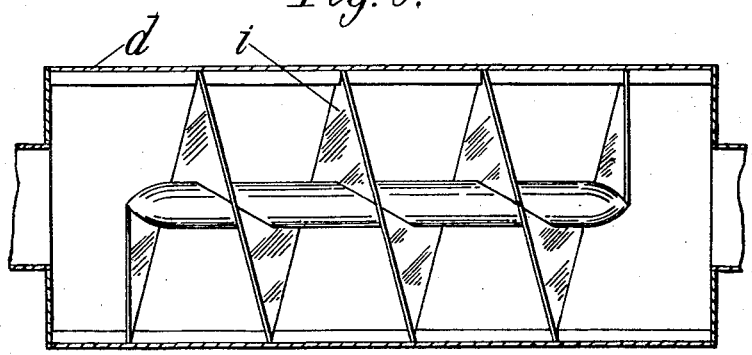
Figure 6 is a longitudinal section of a third form of drum.

In Figure 6, the baffle $i$ is continuously curved but the drum is cylindrical.

What we claim is:

1. A drying machine comprising a drum having an inlet and an outlet, means to rotate the drum, means to feed hot gas and material to be dried into the inlet of the drum with sufficient velocity to carry the material through the drum, means defining a helical baffle within the drum extending from substantially the inlet to the outlet with each convolution of the baffle extending from the center to the inner periphery of the drum, the baffle being rotatable with the drum whereby the hot gas and material flows in a helical path throughout the length of the drum, the pitch of the helical baffle gradually increasing from the inlet to the outlet of the drum whereby the velocity of the hot gas gradually decreases during movement of the material through the drum from the inlet to the outlet, and further means defining flat surfaces within said drum in at least one plane parallel to the length of the drum serving to receive the material falling from the hot gas passing through the drum thereby lifting and tumbling such material during rotation of the drum to augment drying of the material.

2. A drying machine comprising a drum having an inlet and an outlet, means to rotate the drum, means to feed hot gas and material to be dried into the inlet of the drum with sufficient velocity to carry the material through the drum, means defining a helical baffle within the drum extending from substantially the inlet to the outlet with each convolution of the baffle extending from the center to the inner periphery of the drum, the baffle being rotatable with the drum whereby the hot gas and material flows in a helical path throughout the length of the drum, the cross sectional area of the spaces between adjacent convolutions of the baffle gradually increasing from the inlet to the outlet whereby the velocity of the hot gas gradually decreases during movement of the material through the drum from the inlet to the outlet, and further means defining flat surfaces within said drum in at least one plane parallel to the length of the drum serving to receive the material falling from the hot gas passing through the drum thereby lifting and tumbling such material during rotation of the drum to augment drying of the material.

3. A drying machine comprising a drum having an inlet and an outlet, means to rotate the drum, means to feed hot gas and material to be dried into the inlet of the drum with sufficient velocity to carry the material through the drum, a plurality of flat sector-shaped elements disposed at right angles to the length of the drum and spaced longitudinally of the drum from substantially the inlet to the outlet and extending from the center to the inner periphery of the drum, and planar strips disposed in at least one plane parallel to the length of the drum connecting said sector-shaped elements together to define a helical passage through said drum so that the hot gas and material flows in a helical path throughout the length of the drum and also serving to receive the material falling from the hot gas passing through the drum thereby lifting and tumbling such material during rotation of the drum to augment the drying of the material.

4. A drying machine as defined in claim 3 wherein the width of said planar strips gradually increases from the inlet to the outlet of the drum whereby the velocity of the hot gas gradually decreases during movement of the material from the inlet to the outlet.

JOHN WALSH.
HARRY DAWSON.

References Cited in the file of this patent

UNITED STATES PATENTS

| Number | Name | Date |
|---|---|---|
| 317,461 | Justus | May 5, 1885 |
| 606,097 | Stauber | June 21, 1898 |
| 1,338,731 | Hutchinson | May 4, 1920 |
| 1,378,407 | Fraser | May 17, 1921 |
| 1,703,635 | Ranson | Feb. 26, 1929 |
| 2,069,164 | Vogel-Jorgensen | Jan. 26, 1937 |
| 2,311,824 | Gautreau | Feb. 23, 1943 |

FOREIGN PATENTS

| Number | Country | Date |
|---|---|---|
| 71,493 | Norway | Jan. 6, 1947 |
| 660,427 | Great Britain | Nov. 7, 1951 |